United States Patent
Molenaar (10) Patent No.: US 7,027,961 B2
(45) Date of Patent: Apr. 11, 2006

(54) INERTIA IDENTIFICATION FOR ELECTRIC ACTUATORS WITH OBSERVER BASED CONTROLS

(75) Inventor: Gregory A. Molenaar, Fort Collins, CO (US)

(73) Assignee: Woodward Governor Company, Ft. Collins, CO (US)

( * ) Notice: Subject to any disclaimer, the term of this patent is extended or adjusted under 35 U.S.C. 154(b) by 0 days.

(21) Appl. No.: 10/848,424

(22) Filed: May 18, 2004

(65) Prior Publication Data

US 2005/0261867 A1 Nov. 24, 2005

(51) Int. Cl.
*G06F 15/00* (2006.01)
(52) U.S. Cl. .................................. 702/193; 477/120
(58) Field of Classification Search ................ 702/33, 702/41–44, 93, 94, 96, 97, 104, 106, 107, 702/109, 116, 141, 142, 145–151, 182, 183, 702/193; 700/56, 61; 701/62, 63, 69, 45, 701/46, 47; 477/120
See application file for complete search history.

(56) References Cited

U.S. PATENT DOCUMENTS

| | | | | |
|---|---|---|---|---|
| 4,090,118 A | * | 5/1978 | Smith, Jr. ................... | 318/567 |
| 4,223,573 A | * | 9/1980 | Franssen ...................... | 477/109 |
| 4,312,249 A | * | 1/1982 | Hau et al. ................... | 477/120 |
| 5,049,383 A | * | 9/1991 | Huth et al. .................. | 424/405 |
| 5,088,043 A | * | 2/1992 | Akishino et al. ............. | 701/93 |
| 5,197,566 A | * | 3/1993 | Watanabe et al. ........... | 180/249 |
| 5,634,794 A | * | 6/1997 | Hildreth et al. ............... | 434/37 |
| 5,669,847 A | * | 9/1997 | Kashiwabara ................ | 477/46 |
| 6,067,495 A | * | 5/2000 | Fliearman et al. ............ | 701/55 |

* cited by examiner

*Primary Examiner*—Marc S. Hoff
*Assistant Examiner*—Mohamed Charioui
(74) *Attorney, Agent, or Firm*—Reinhart Boerner Van Deuren P.C.

(57) ABSTRACT

A method to automatically identify the inertia of an actuator (and the like) and load for tuning an observer-based controller is presented. The tuning is a one-time process that is initiated by a user when the actuator is installed. The control includes a model of the actuator with state feedback to set the desired dynamics.

28 Claims, 8 Drawing Sheets

INERTIA IDENTIFICATION FOR ELECTRIC ACTUATORS WITH OBSERVER BASED CONTROLS

FIELD OF THE INVENTION

This invention pertains to actuator controllers, and more particularly to calibrating actuator controllers.

BACKGROUND OF THE INVENTION

The controller structure for many observer-based controllers is the same for numerous actuator sizes. Control parameters are typically based on physical parameters such as torque per ampere, coil resistance, coil inductance, friction, and inertia. For a particular actuator model, unit-to-unit variation of physical parameters is such that all but friction and inertia control parameters are fixed values for each actuator model. Inertia and friction vary depending on what load is attached to the actuator. This is not a big problem for gear-drive actuators because the load inertia as seen by the actuator is reduced by the square of the gear ratio.

However, direct drive actuators generally have lower cost and better reliability than gear-drive actuators. The inertia and friction variation is a problem with direct drive actuators because there is no gear ratio to provide a mechanical advantage. Friction and inertia parameters can be set in a factory type setting when the actuators have an actuator (or other known inertia load) attached at the factory. However, the cost of setting and verifying parameters is only practical for high volume applications due to the costs involved. For other actuators where the load parameters are not known, such as an attachment to a customer's actuator, diesel rack, etc., the inertia parameter needs to be set when installed or a default parameter used.

The problem with using a default parameter is that the allowed range of load inertia is limited. As a result, the potential range of applications for the actuator is reduced when a default parameter is used.

Another possible solution is to make the customer adjust the inertia parameter(s) in the controller. Customer tuning of the inertia parameter has proven to be a problem for numerous reasons. For example, a customer typically does not know the inertia of the load. Tuning the controller by behavior of the actuator is subjective and it does not correspond to the familiar PID (Proportional, Integral, Derivative) gains of which many customers are familiar. This often causes customer confusion and poor actuator tuning.

A further option is to have the controller identify the inertia and tune itself. However, identifying inertia in an observer-based model is difficult because it is located (e.g., hidden) in the middle of the actuator transfer function, is immediately downstream of strong non-linear disturbances (load and friction), and upstream of two integrators. Ideally, net torque and acceleration is measured to determine the inertia parameter setting. However, measuring net torque and acceleration requires sensors that would otherwise not be needed, which results in higher costs and increased board space. In numerous applications, only applied voltage and position is measurable. What is needed is a method to tune the inertia parameter using applied voltage and position measurements.

The invention provides such a method. These and other advantages of the invention, as well as additional inventive features, will be apparent from the description of the invention provided herein.

BRIEF SUMMARY OF THE INVENTION

The invention provides a method to automatically identify the inertia of an actuator (and the like) and load for tuning an observer-based controller. The tuning is a one-time process that is initiated by a user when the actuator is installed. The control includes a model of the actuator with state feedback to set the desired dynamics.

The invention uses a correction loop that forces the model and plant to be asymptotic. An initial estimate of the inertia estimate is derived and used as the inertia parameter. The actuator is operated and the magnitudes of expected acceleration (i.e., uncorrected model output of acceleration) and actual acceleration (i.e., corrected acceleration output) are integrated during several large position movements. The inertia estimate is adjusted to drive the ratio of the expected acceleration and actual acceleration to unity. The process is repeated until the ratio is within a tolerance band. When the ratio is within a desired tolerance, the inertia estimate is used as the inertia parameter in the controller.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a method to automatically identify the inertia of an actuator (and the like) and load for tuning an observer-based controller without requiring an end-user of the actuator (e.g., a customer) to manually adjust the inertia control parameters. As a result of the invention, customers do not need to have any knowledge of the control loops or control theory knowledge, thereby eliminating a possible source of confusion for the customer.

Prior to describing the invention in detail, an exemplary system in which the invention may be implemented is first described with reference to FIG. 1. Turning to the drawings, wherein like reference numerals refer to like elements, the invention is illustrated as being implemented in a suitable environment. Although not required, the invention will be described in the general context of computer-executable instructions, such as program modules, being executed by a computing device such as an actuator controller. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
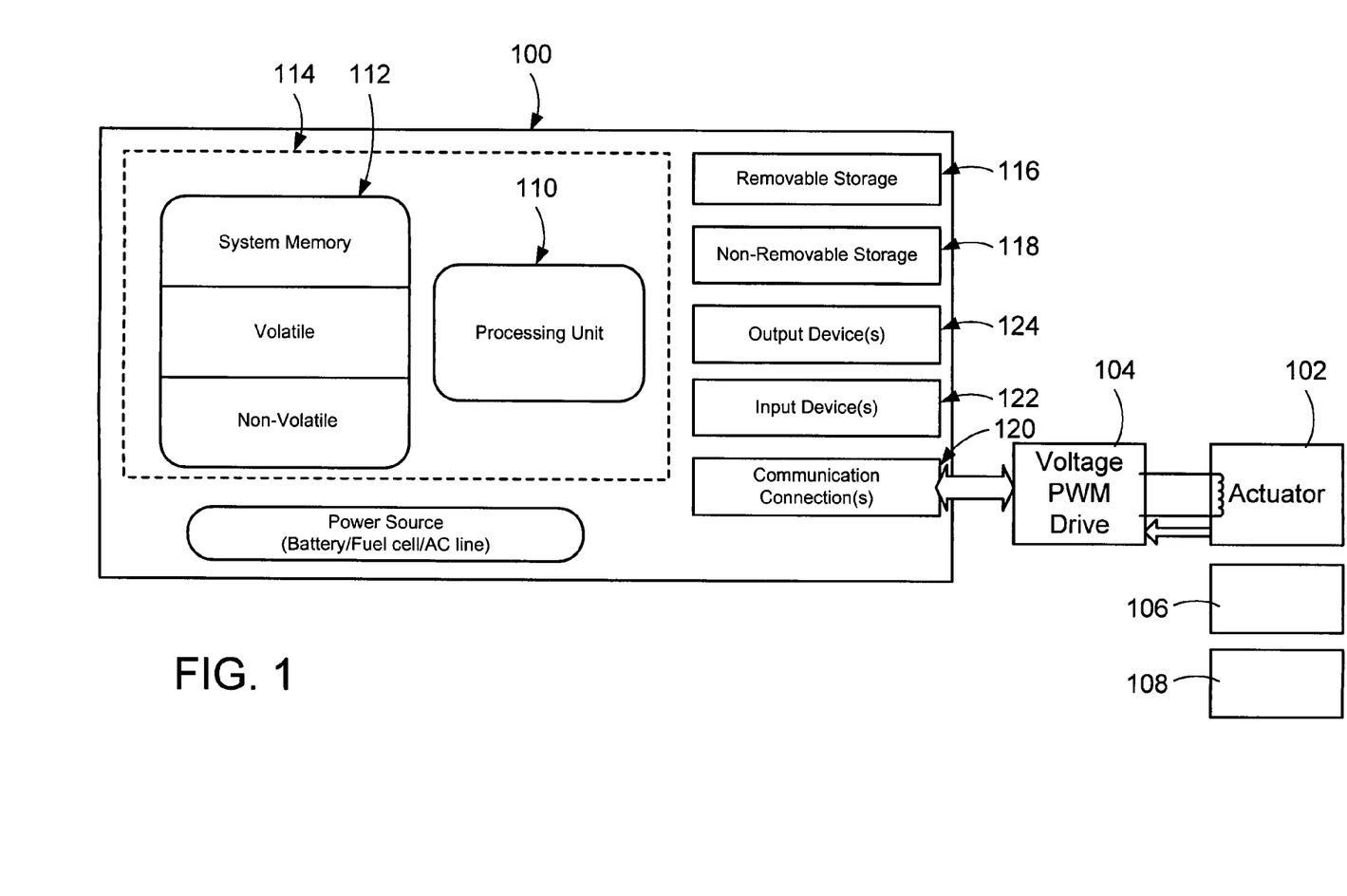
FIG. 1 is a block diagram generally illustrating an exemplary environment in which an embodiment of the invention may be implemented.

FIG. 1 shows an exemplary computing device 100 communicating with an actuator 102 via PWM (Pulse Width Modulation) voltage drive 104 for implementing an embodiment of the invention. The actuator has a position feedback device 106 connected to the actuator's output, which drives load 108. The actuator 102, drive 104, and position feedback device 106 are well known in the art and need not be described in detail herein. In its most basic configuration, the computing device 100 includes at least a processing unit 110 and a memory 112. Depending on the exact configuration and type of computing device, the memory 112 may be volatile (such as RAM), non-volatile (such as ROM, flash memory, etc.) or some combination of the two. This most basic configuration is illustrated in FIG. 1 by a dashed line 114. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 116 and a non-removable storage 118. Computer storage media includes volatile and nonvolatile, removable and non-removable media implemented in any method or technology for storage of information such as computer readable instructions, data structures, program modules or other data. The memory 112, the removable storage 116 and the non-removable storage 118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 120 that allow the device to communicate with other devices. The communications connections 120 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 122 such as keyboard, mouse, pen, voice input device, touch-input device, etc. One or more output devices 124 such as a display, speakers, printer, etc. may also be included. All these devices are well known in the art and need not be discussed at greater length here.

Figure 2:
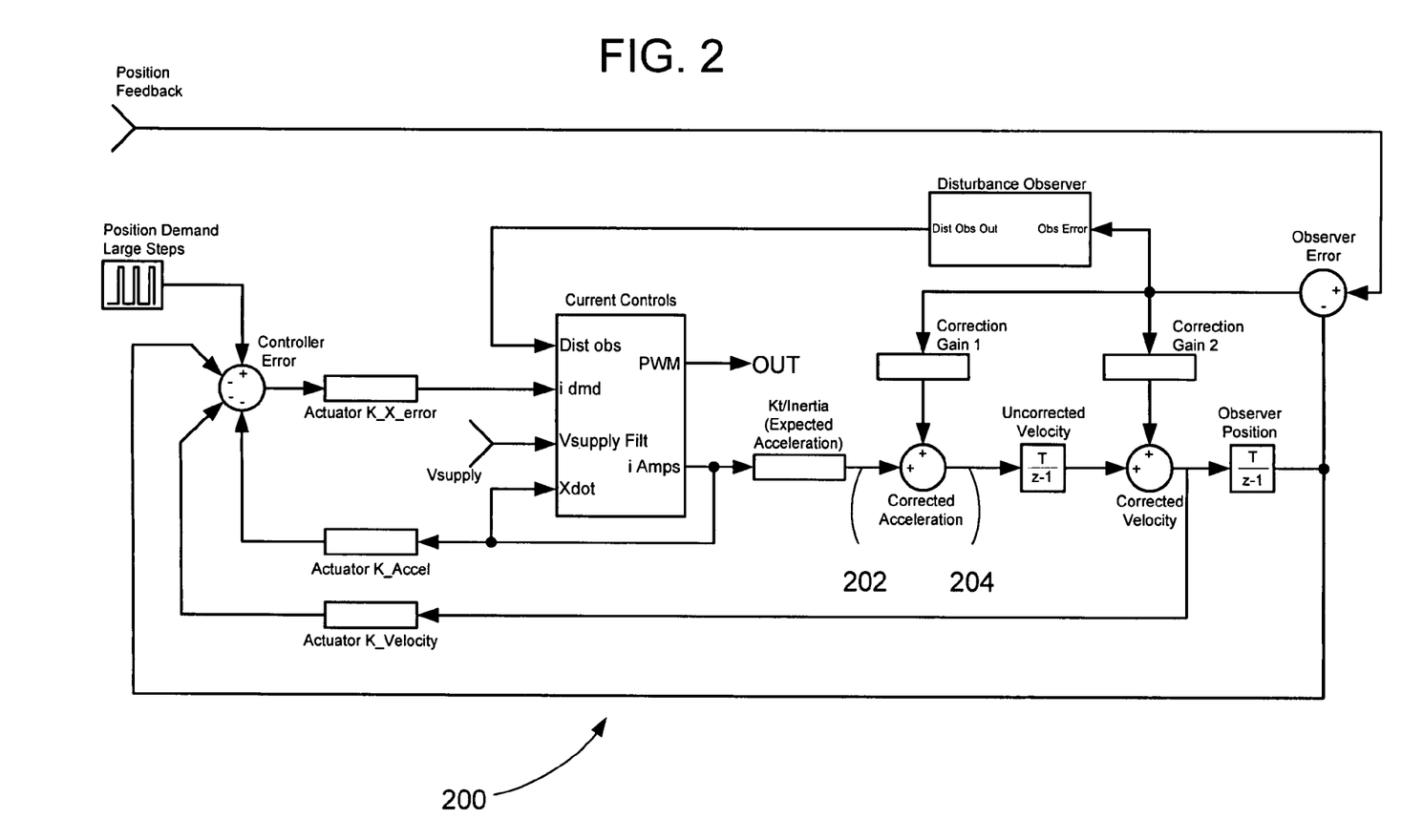
FIG. 2 is a diagram illustrating an exemplary control block diagram of a controller in which the present invention may use.
Figure 3:
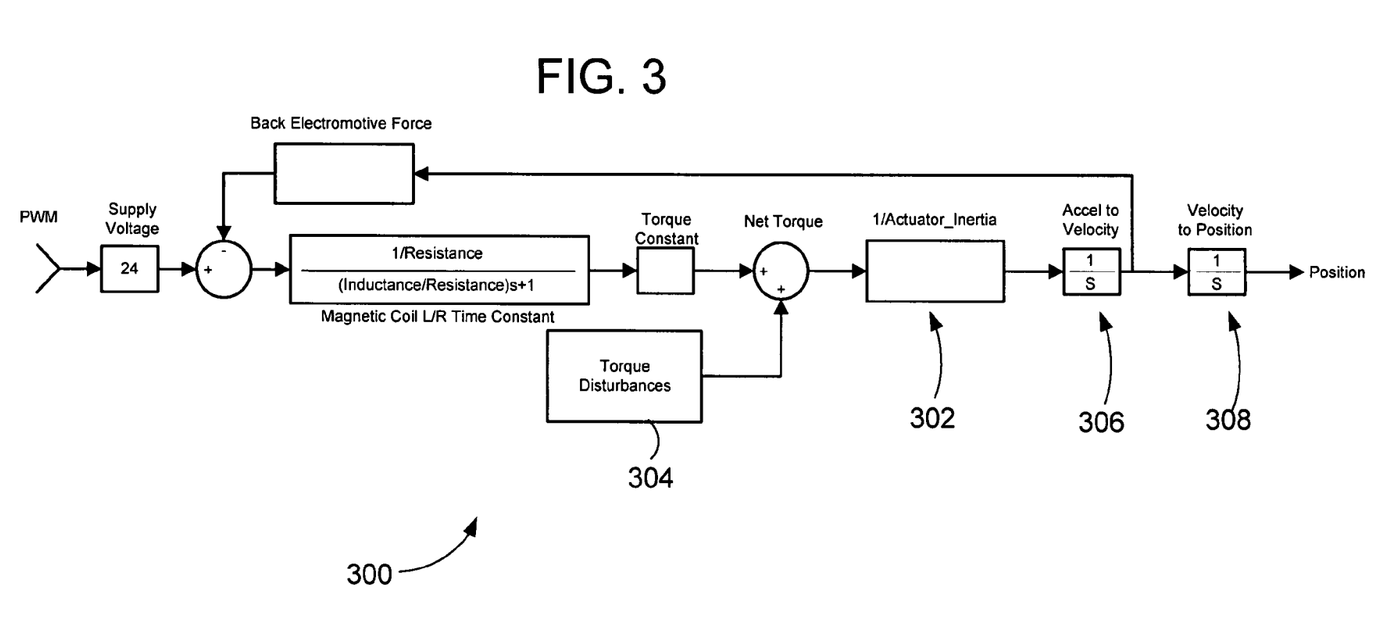
FIG. 3 is a block diagram illustrating an actuator transfer function in which the present invention derives an inertia parameter

Turning now to FIGS. 2 and 3 in conjunction with FIGS. 4a–4b, the steps taken of the invention shall now be described. FIG. 2 shows a simplified block diagram of the relevant portions of an exemplary position controller with observer based current control that the invention uses to determine the inertia parameter for the inertia parameter of the actuator model of FIG. 3. As can be seen from FIG. 3, identifying inertia in an observer-based model is not easy because the inertia parameter 302 is located in the middle of the actuator transfer function 300, is immediately downstream of strong non-linear disturbances 304 (e.g., torque disturbances such as load and friction), and upstream of two integrators 306, 308. While an observer based current control is shown, it is understood by those skilled in the art that the method of the invention will work with other observer based controls and that the method of current control is not related to the invention. The observer-based control 200 contains a model of the actuator with state feedback setting the desired dynamics. A correction loop keeps the model from drifting relative to the plant and a disturbance observer (e.g., proportional plus integral control) identifies and cancels torque disturbances.

The controller 200 has two acceleration signals that are used in the determination of the inertia parameter. These two acceleration signals are "Expected Acceleration" (designated by 202) and "Corrected Acceleration" (designated by 204). The controller feedbacks (Actuator K_Accel and Actuator K_Velocity) set a desired trajectory between the present position and the demanded position. The desired trajectory is used to create an "Expected Acceleration" using control techniques well known in the art. A correction loop prevents the controller from drifting away from the actual response. The correction loop modifies "Expected Acceleration" to create a "Corrected Acceleration" signal. The difference between the signals is the Observer Error times a gain. Expected Acceleration and Corrected Acceleration are identical if there are perfectly matched physical parameters and no disturbances.

Errors that contribute to the observer error are the inertia parameter in the transfer functions, instantaneous phase differences between model position and position from a feed back transducer with anti-alias filtration, and friction disturbances. The present invention minimizes the effects of phase differences and disturbances by using commands such as large steps in position demand (i.e., a large signal response) to minimize the influence of friction and feedback noise and integrates instantaneous signals over time to avoid misinterpretation due to filters and other phase differences.

Figure 4A:
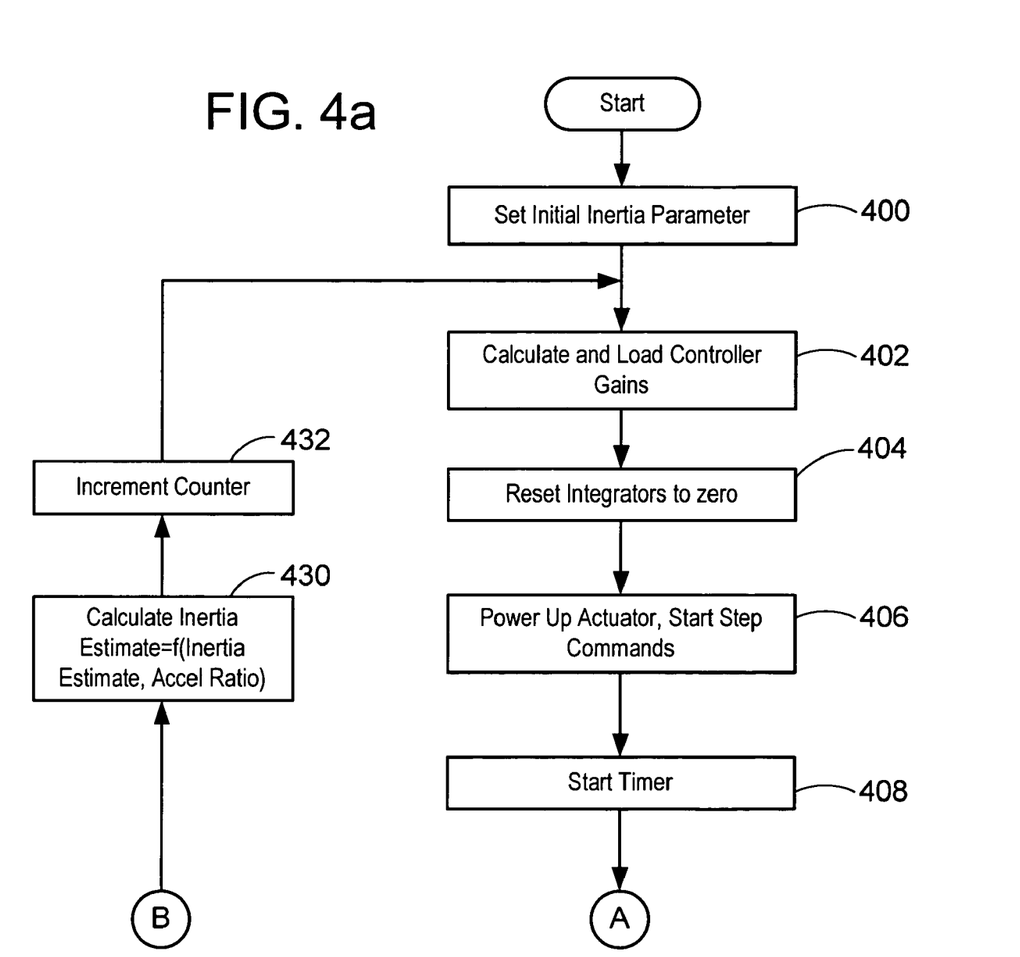
FIGS. 4a–4b are a flowchart showing the steps for deriving an inertia parameter in accordance with the teachings of the present invention.
Figure 4B:
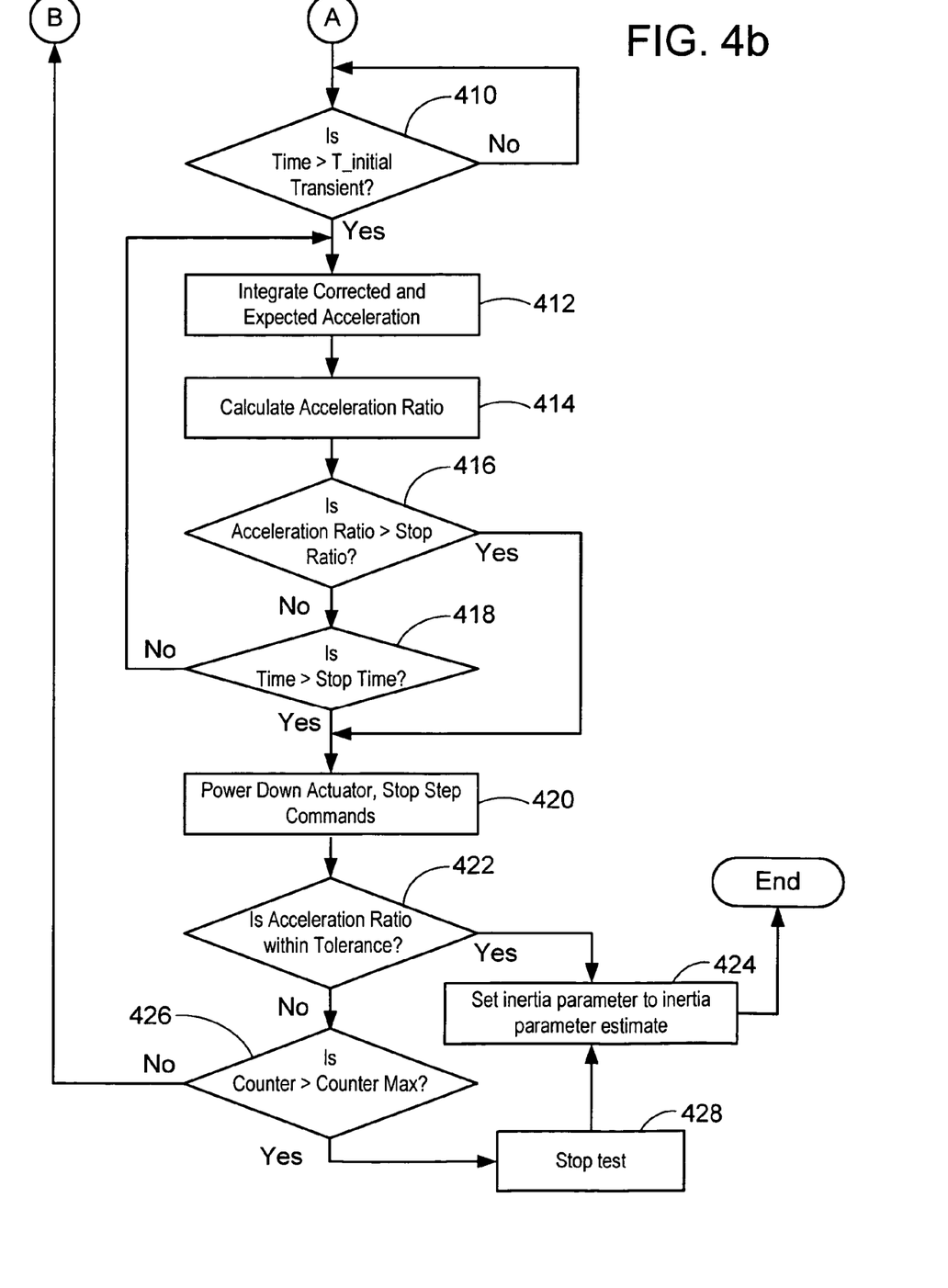

Referring now to FIGS. 4a–4b, the invention determines the inertia parameter after the actuator is installed. An initial estimate of the inertia value is determined and the inertia parameter is set (step 400). A counter is also reset or set to its initial value. The counter is used to limit the number of cycles run to avoid operating the calibration cycle for an unnecessary number of cycles.

The initial estimate may be based upon similar actuators or a default value may be used. In one embodiment, the inertia of the "bare" actuator is used as the initial estimate. If the estimate is too high or too low, the actuator will oscillate. The inertia parameter is set based upon the estimate. The inertia parameter may be the estimate or it may be calculated with the initial estimate used in a formula. In one embodiment, the inertia parameter is a factor in gains of the plant model 200 and the disturbance observer. The controller gains that are functions of inertia are calculated based on the inertia estimate and loaded into the control system (step 402). The integrators (508, 510—see FIG. 5) are reset to zero (step 404).

The actuator is then powered up and operated with large position commands (step 406) for a short period of time. For example, the time in one embodiment is a minimum of 0.5 seconds and a maximum of 1.5 seconds. The minimum time is set such that enough data is collected to allow the integration of the signals to take place and be useable. For example, data acquired during power-up conditions may not be useable in some situations. As previously explained, the large commands are used to minimize the effects on friction and feedback noise. Note that the position commands include signals such as steps, large signal sine response, fast ramp response, and other types of command signals. Possible ranges are steps from 20% to 80% and back, 15% to 85% and back, and the like.

A timer is also started (step 408). The integrators are not released until after a initial transient time has passed so that the integrators do not integrate the power-up transients and produce meaningful results. For example, the integrators are held until 0.5 seconds has passed. After the initial transient time has passed (step 410), either the absolute value or squared value of Expected Acceleration 202 and Corrected Acceleration 204 are integrated (step 412). The ratio of these integrated signals, designated as acceleration ratio, is calculated (step 414). The acceleration ratio is inversely proportional to the ratio between model inertia and actual inertia. When the acceleration ratio approaches unity, the observer error nears zero, which means the Expected Acceleration 202 and Corrected Acceleration 204 are approaching the same value.

In one embodiment, the calculation of the acceleration ratio is coincidental with the integration of the accelerations. The acceleration is checked after the integrators have operated for a period of time. If the acceleration ratio becomes greater than a stop value (step 416), the test run is stopped and the actuator is powered down (step 420). If the actuator is oscillating the acceleration ratio will quickly exceed the stop value. Preferably, the integrators are releases just before the first position movement and the acceleration ratio is not compared to the stop value until there is sufficient data to be meaningful. If the acceleration ratio stays below the stop ratio, the timer is compared to the stop time (e.g., maximum time of 1.5 seconds) (step 418). If the timer is below the stop time, steps 412–416 are repeated until the timer is at least the stop time.

Once the actuator has powered down, the acceleration ratio is checked to see if it is within a specified tolerance of an acceptable value (step 422). The tolerance may be a ± percentage of the acceptable value, below the acceptable value, ± a fixed value, etc. Ideally, the acceleration ratio is unity. A unity value means that the Expected Acceleration and Corrected Acceleration values are identical or nearly identical. In one embodiment, the acceptable range is selected such that the actuator performance is acceptable for the installation. For example, the range of acceptable values is narrower if the actuator is used in a critical process than if the actuator is used to coarsely control the position of an item. In an alternate embodiment, the acceptable range is predefined and is based upon typically achieved ranges. Typical acceptable values range from +/−0.1 to +/−0.5.

If the acceleration ratio is within the specified tolerance, the inertia parameter is set based upon the estimated inertia value (step 424). If the acceleration ratio is not within the specified tolerance, the counter value is checked to determine if it is equal to or greater than a maximum counter value (step 426). The test is stopped if the counter value is greater than the maximum counter value (step 428). Typically, the number of cycles needed is less than five. The maximum counter value is set to a number above the typical number of cycles. For example, the maximum counter value can range from 5 to 10 or higher. The inertia parameter is set to the latest inertia parameter estimate (step 424) and the test ends.

If the counter value is below the maximum counter value, a revised inertia value is determined and the control parameters are set based upon the revised inertia value (step 430) and the counter is incremented (step 432). The inertia value is increased if the Expected Acceleration is greater than the Corrected Acceleration and decreased if Expected Acceleration is less than Corrected Acceleration. The procedure of steps 402 to 432 is then repeated. The revised inertia value is a function of the present inertia value and the acceleration ratio. For example, in one embodiment, if the absolute values of Corrected Acceleration and Expected Acceleration are being used to calculate the acceleration ratio, the revised inertia value is set to the present inertia value times the acceleration ratio. If the squared values of Corrected Acceleration and Expected Acceleration are being used to calculate the acceleration ratio, the revised inertia value is set to the present inertia value times the square root of the acceleration ratio.

Figure 5:
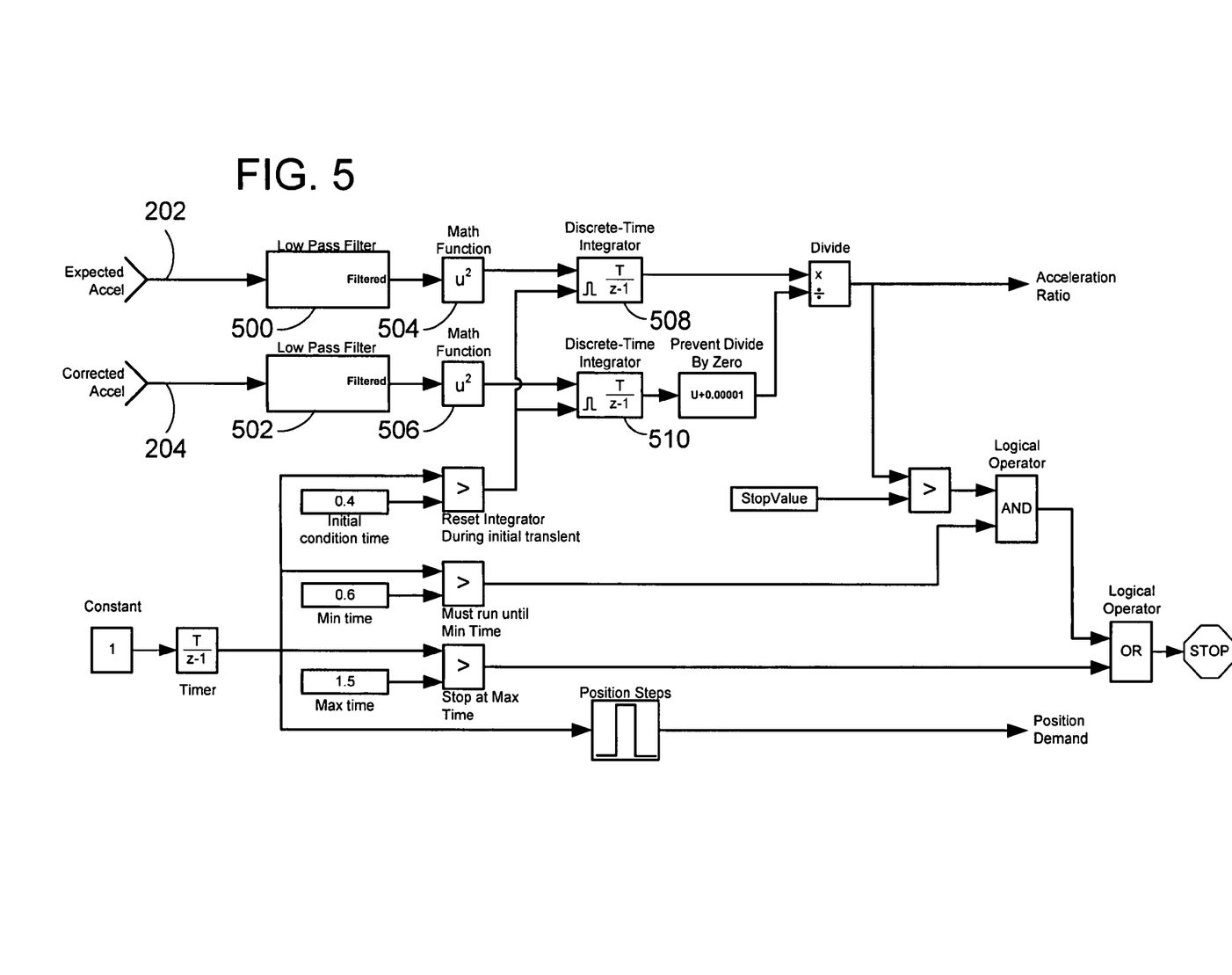
FIG. 5 is a block diagram illustrating one embodiment of the real-time control portion in accordance with the teachings of the present invention.

FIG. 5 illustrates an implementation of the real-time portion of the method described above. Expected Acceleration 202 and Corrected Acceleration 204 are filtered to improve the signal to noise ratio. Note that the filters 500, 502 are optional. The filters 500, 502 in one embodiment are each set at 10 radians/second to improve the signal to noise ratio. It is important that these filters are ahead of the signal rectification 504, 506 (absolute value or square function), and that the filters are balanced (i.e., they have the same cutoff frequency). The filter 500 on expected acceleration may actually be slightly slower than on corrected acceleration filter 502 to account for anti-aliasing filters, which are only in the feedback (corrected acceleration) path. The rectified signals are integrated by integrators 508, 510. A small value is added to the integrated corrected acceleration signal to prevent the possibility of a divide by zero error from occurring. The signals are divided to produce the acceleration ratio. This process continues until the test is finished, the acceleration ratio rises above a stop value after a minimum time has passed, or a maximum operating time is reached. During the initial start of the test (e.g., when the system is powering up), the integrators 508, 510 are reset to avoid false readings due to initial condition transients.

Figure 6A:
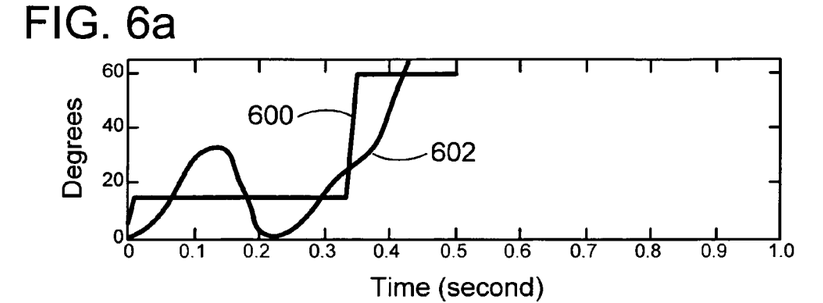
FIGS. 6a–6d illustrate how the present invention tunes the inertia parameter to a state with friction present in accordance with the teachings of the present invention.
Figure 6B:
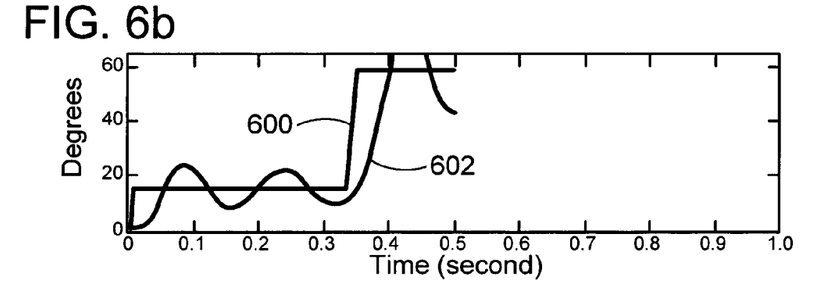
Figure 6C:
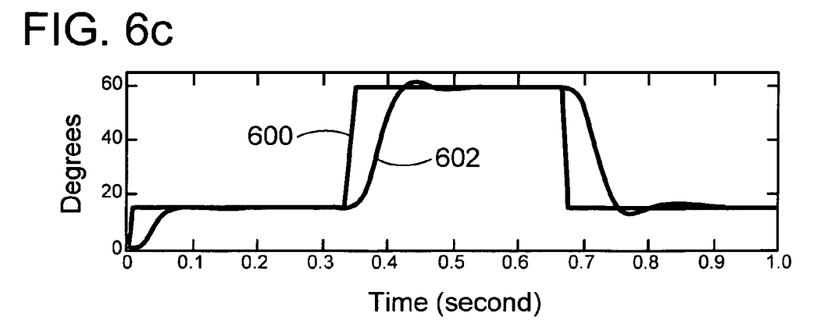
Figure 6D:
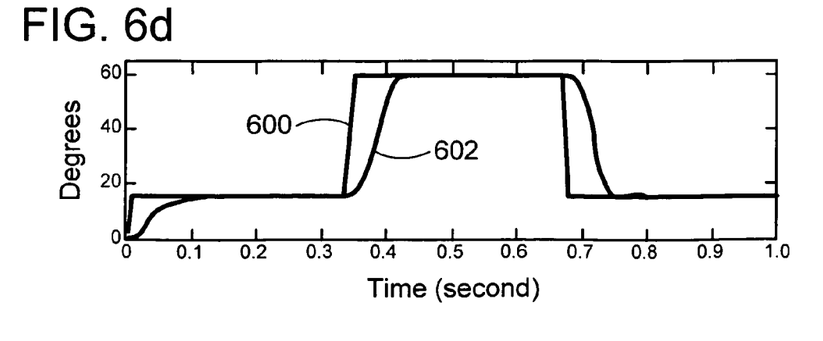

FIGS. 6a–6d show an example of how the inertia value can be acquired using the procedure described above. Line 600 represents the commanded step and line 602 represent the actuator movement in response to the commanded step. FIG. 6a shows the response when the inertia value estimate is one. It can be seen that the actuator becomes unstable and the test is stopped when the acceleration ratio exceeds the stop value. It should be noted that when the actuator is oscillating, the acceleration ratio very quickly exceeds the stop value. The inertia value estimate is revised to be a value of 3.1 and the steps rerun. FIG. 6b shows the response with an inertia value set to 3.1. The acceleration ratio again exceeds the stop value. The inertia value estimate is revised to be a value of 9.3 and the steps rerun. FIG. 6c shows the response with an inertia value set to 9.3. Although the actuator tracks the commanded steps, and the performance may be acceptable for a particular application, the acceleration ratio is not within the specified tolerance. The inertia value is revised to be a value of 14.5, and the test re-run. FIG. 6d shows the response with an inertia value set to 14.5. The acceleration ratio is now within the specified tolerance. It can be seen that the actuator tracks the commanded step and overshoot is minimal.

Figure 7A:
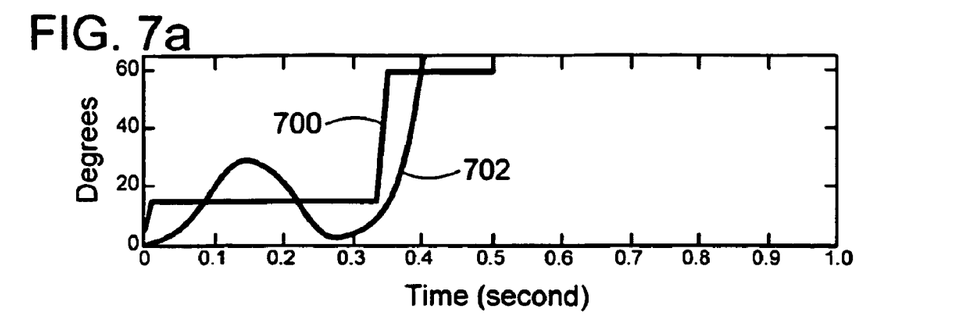
FIGS. 7a–7d illustrate how the present invention tunes the inertia parameter to a state without friction present in accordance with the teachings of the present invention.
Figure 7B:
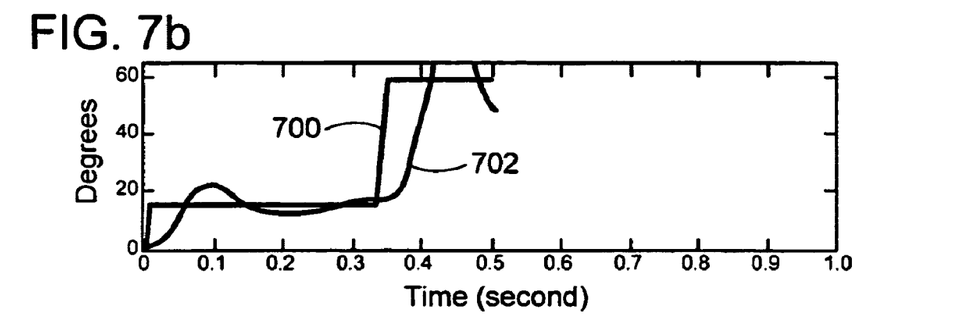
Figure 7C:
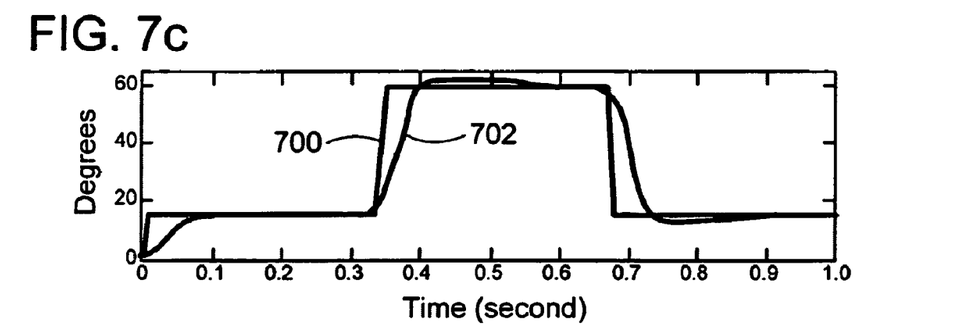
Figure 7D:
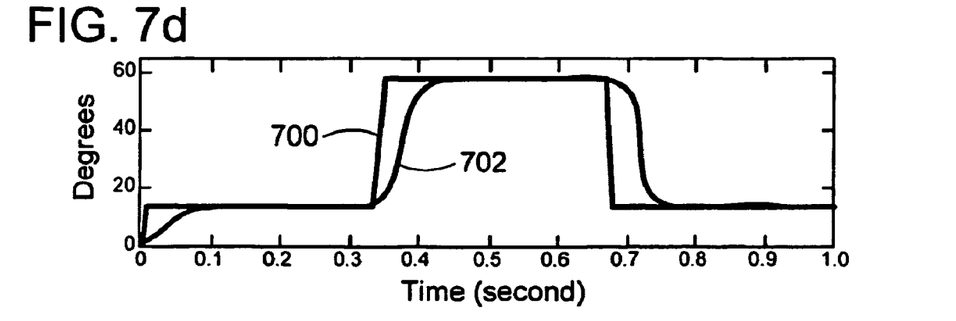

FIGS. 7a–7d show an example of how the inertia value can be acquired using the procedure described above with friction present in the actuator (or load). Line 700 represents the commanded step and line 702 represent the actuator movement in response to the commanded step. FIG. 7a shows the response when the inertia value estimate is one. It can be seen that the actuator becomes unstable in a similar fashion to FIG. 6a and the test is stopped when the acceleration ratio exceeds the stop value. The inertia value estimate is revised to be a value of 3.1 and the steps rerun. FIG. 7b shows the response with an inertia value set to 3.1. The acceleration ratio again exceeds the stop value. The inertia value estimate is revised to be a value of 9.3 and the steps rerun. FIG. 7c shows the response with an inertia value set to 9.3. Although the actuator tracks the commanded steps, and the performance may be acceptable for a particular application, the acceleration ratio is not within the specified tolerance. The inertia value is revised to be a value of 14.5, and the test re-run. FIG. 7d shows the response with an inertia value set to 14.5. The acceleration ratio is now within the specified tolerance. It can be seen that the actuator tracks the commanded step and the overshoot is minimal.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "computer-implemented" is to be construed to cover hand-held devices, single or multi-processor systems, microprocessor based or programmable consumer or industrial electronics, network PCs, laptops, minicomputers, mainframe computers, programmable arrays, actuator controllers, any combinations of the above, and similar systems and devices. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method to determine an inertia parameter for an observer-based control, the method comprising the steps of:
    a) determining an initial value for the inertia parameter;
    b) running the actuator with predetermined position commands using the initial value for the inertia parameter;
    c) integrating an expected acceleration signal to form an integrated expected acceleration;
    d) integrating a corrected acceleration signal to form an integrated corrected acceleration;
    e) calculating an acceleration ratio using the integrated expected acceleration and the integrated corrected acceleration;
    f) comparing the acceleration ratio to a predetermined value; and
    g) setting the inertia parameter to the initial value if the acceleration ratio is within a specified tolerance of the predetermined value.

2. The computer-implemented method of claim 1 further comprising the steps of:
    if the acceleration ratio is outside of the specified tolerance of the predetermined ratio:
    h) determining a revised value based upon the integrated expected acceleration and the integrated corrected acceleration;
    i) running the actuator with predetermined position commands using the revised value for the inertia parameter;
    j) repeating steps c) to f); and
    k) setting the inertia parameter to the revised value if the acceleration ratio is within a specified tolerance of the predetermined value.

3. The computer-implemented method of claim 2 wherein the step of determining a revised value based upon the integrated expected acceleration and the integrated corrected acceleration includes the step of setting the revised value to a function of a present value and the acceleration ratio.

4. The computer-implemented method of claim 3 wherein the step of setting the revised value to a function of the present value and the acceleration ratio comprises the step of setting the revised value to the present value times one of the acceleration ratio and the square root of the acceleration ratio.

5. The computer-implemented method of claim 2 further comprising the steps of repeating steps h–k until the acceleration ratio is within the specified tolerance of the predetermined value.

6. The computer-implemented method of claim 2 further comprising the steps of:
    initializing a counter after the initial value is determined;

incrementing the counter after each time the actuator is run;

repeating steps h–k until one of the counter is at least equal to a maximum value and the acceleration ratio is within the specified tolerance of the predetermined value; and setting the inertia parameter to the revised value after the one of the counter is at least equal to a maximum value and the acceleration ratio is within the specified tolerance of the predetermined value.

7. The computer-implemented method of claim 2 further comprising the steps of:
l) detecting instability by comparing the acceleration ratio to a predetermined stop value;
m) stopping the running of the actuator if the acceleration ratio limit is exceeded; and
n) repeating the steps of h–n until the acceleration ratio is within the specified tolerance.

8. The computer-implemented method of claim 1 further comprising the steps of:
comparing the acceleration ratio to a stop value;
if the acceleration ratio is at least the stop value:
h) stopping the running of the actuator;
i) setting the inertia parameter to a predetermined inertia value;
j) running the actuator with predetermined position commands using the predetermined inertia value for the inertia parameter;
k) repeating steps c) to f); and
l) setting the inertia parameter to the revised value if the acceleration ratio is within a specified tolerance of the predetermined value.

9. The computer-implemented method of claim 8 further comprising the steps of repeating steps h–l until the acceleration ratio is within the specified tolerance of the predetermined value.

10. The computer-implemented method of claim 1 wherein the step of running the actuator with predetermined position commands comprises the step of running the actuator with commanded position steps from at least below 20% of the actuator stroke to at least above 80% of the actuator stroke and from the at least 80% of the actuator stroke to the at least 20% of the actuator stroke.

11. The computer-implemented method of claim 10 wherein the step of running the actuator with commanded position steps from at least below 20% of the actuator stroke to at least above 80% of the actuator stroke and from the at least 80% of the actuator stroke to the at least 20% of the actuator stroke comprises the step of running the actuator with commanded position steps from approximately 15% of the actuator stroke to approximately 85% of the actuator stroke and from the approximately 85% of the actuator stroke to the approximately 15% of the actuator stroke.

12. The computer-implemented method of claim 1 wherein the predetermined value is not equal to 1.

13. The computer-implemented method of claim 1 wherein the steps of integrating an expected acceleration signal to form an integrated expected acceleration, integrating a corrected acceleration signal to form an integrated corrected acceleration, and calculating an acceleration ratio using the integrated expected acceleration and the integrated corrected acceleration comprises the steps of integrating the absolute value of the expected acceleration signal to form an integrated absolute value of expected acceleration, integrating the absolute value of the corrected acceleration signal to form an integrated absolute value of corrected acceleration and calculating an acceleration ratio using the integrated absolute value of expected acceleration and the integrated absolute value of corrected acceleration.

14. The computer-implemented method of claim 1 wherein the step of determining an initial value for the inertia parameter comprises the step of using a predetermined initial inertia parameter for the initial value.

15. A computer-readable medium having computer executable instructions for determining an inertia parameter for an observer-based control, the computer executable instructions performing the steps of:
a) determining an initial value for the inertia parameter;
b) running the actuator with predetermined position commands using the initial value for the inertia parameter;
c) integrating an expected acceleration signal to form an integrated expected acceleration;
d) integrating a corrected acceleration signal to form an integrated corrected acceleration;
e) calculating an acceleration ratio using the integrated expected acceleration and the integrated corrected acceleration;
f) comparing the acceleration ratio to a predetermined value; and
g) setting the inertia parameter to the initial value if the acceleration ratio is within a specified tolerance of the predetermined value.

16. The computer-readable medium of claim 15 having further computer executable instructions for performing the steps comprising:
if the acceleration ratio is outside of the specified tolerance of the predetermined ratio:
h) determining a revised value based upon the integrated expected acceleration and the integrated corrected acceleration;
i) running the actuator with predetermined position commands using the revised value for the inertia parameter;
j) repeating steps c) to f); and
k) setting the inertia parameter to the revised value if the acceleration ratio is within a specified tolerance of the predetermined value.

17. The computer-readable medium of claim 16 wherein the step of determining a revised value based upon the integrated expected acceleration and the integrated corrected acceleration includes the step of setting the revised value to a function of a present value and the acceleration ratio.

18. The computer-implemented method of claim 17 wherein the step of setting the revised value to a function of the present value and the acceleration ratio comprises the step of setting the revised value to the present value times one of the acceleration ratio and the square root of the acceleration ratio.

19. The computer-readable medium of claim 16 having further computer executable instructions for performing the steps comprising repeating steps h–k until the acceleration ratio is within the specified tolerance of the predetermined value.

20. The computer-readable medium of claim 16 having further computer executable instructions for performing the steps comprising:
initializing a counter after the initial value is determined;
incrementing the counter after each time the actuator is run;
repeating steps h-k until one of the counter is at least equal to a maximum value and the acceleration ratio is within the specified tolerance of the predetermined value; and
setting the inertia parameter to the revised value after the one of the counter is at least equal to a maximum value and the acceleration ratio is within the specified tolerance of the predetermined value.

21. The computer-readable medium of claim 16 having further computer executable instructions for performing the steps comprising:
   l) stopping the running of the actuator if the actuator is one of starting to oscillate and oscillating;
   m) setting the revised value to a predetermined limit; and
   n) repeating the steps of h-n until the acceleration ratio is within the specified tolerance of the predetermined value.

22. The computer-readable medium of claim 15 having further computer executable instructions for performing the steps comprising:
   comparing the acceleration ratio to a stop value;
   if the acceleration ratio is at least the stop value:
      h) stopping the running of the actuator;
      i) setting the inertia parameter to a predetermined inertia value;
      j) running the actuator with predetermined position commands using the predetermined inertia value for the inertia parameter;
      k) repeating steps c) to f); and
      l) setting the inertia parameter to the revised value if the acceleration ratio is within a specified tolerance of the predetermined value.

23. The computer-readable medium of claim 22 having further computer executable instructions for performing the steps comprising repeating steps h–l until the acceleration ratio is within the specified tolerance of the predetermined value.

24. The computer-readable medium of claim 15 wherein the step of running the actuator with predetermined position commands comprises the step of running the actuator with commanded position steps from at least below 20% of the actuator stroke to at least above 80% of the actuator stroke and from the at least 80% of the actuator stroke to the at least 20% of the actuator stroke.

25. The computer-readable medium of claim 24 wherein the step of running the actuator with commanded position steps from at least below 20% of the actuator stroke to at least above 80% of the actuator stroke and from the at least 80% of the actuator stroke to the at least 20% of the actuator stroke comprises the step of running the actuator with commanded position steps from approximately 15% of the actuator stroke to approximately 85% of the actuator stroke and from the approximately 85% of the actuator stroke to the approximately 15% of the actuator stroke.

26. The computer-readable medium of claim 15 wherein the predetermined value is not equal to 1.

27. The computer-readable medium of claim 15 wherein the steps of integrating an expected acceleration signal to form an integrated expected acceleration, integrating a corrected acceleration signal to form an integrated corrected acceleration, and calculating an acceleration ratio using the integrated expected acceleration and the integrated corrected acceleration comprises the steps of integrating the absolute value of the expected acceleration signal to form an integrated absolute value of expected acceleration, integrating the absolute value of the corrected acceleration signal to form an integrated absolute value of corrected acceleration and calculating an acceleration ratio using the integrated absolute value of expected acceleration and the integrated absolute value of corrected acceleration.

28. The computer-readable medium of claim 15 wherein the step of determining an initial value for the inertia parameter comprises the step of using a predetermined initial inertia parameter for the initial value.

* * * * *